United States Patent
Monsen

(10) Patent No.: US 9,071,313 B2
(45) Date of Patent: Jun. 30, 2015

(54) METHOD AND APPARATUS FOR DEMODULATION OF A DESIRED SIGNAL IN THE PRESENCE OF NONLINEAR-DISTORTED INTERFERENCE

(71) Applicant: Datum Systems, Inc., San Jose, CA (US)

(72) Inventor: Peter Monsen, Stowe, VT (US)

(*) Notice: Subject to any disclaimer, the term of this patent is extended or adjusted under 35 U.S.C. 154(b) by 0 days.

(21) Appl. No.: 14/073,374

(22) Filed: Nov. 6, 2013

(65) Prior Publication Data

US 2014/0126675 A1  May 8, 2014

Related U.S. Application Data

(60) Provisional application No. 61/723,570, filed on Nov. 7, 2012.

(51) Int. Cl.
  *H04B 1/10* (2006.01)
(52) U.S. Cl.
  CPC ........................ *H04B 1/10* (2013.01)
(58) Field of Classification Search
  CPC ...................................................... H04B 1/10
  USPC .................................................. 375/350, 343
  See application file for complete search history.

(56) References Cited

U.S. PATENT DOCUMENTS

| | | | |
|---|---|---|---|
| 2002/0039887 A1* | 4/2002 | Delabbaye et al. | 455/42 |
| 2003/0099309 A1* | 5/2003 | Fimoff et al. | 375/340 |
| 2004/0101034 A1* | 5/2004 | Ben-David et al. | 375/148 |
| 2006/0067438 A1* | 3/2006 | Menkhoff et al. | 375/343 |
| 2014/0195577 A1* | 7/2014 | Nikitin | 708/304 |

* cited by examiner

*Primary Examiner* — Michael Neff
(74) *Attorney, Agent, or Firm* — Mintz Levin Cohn Ferris Glovsky and Popeo, P.C.; Steve Jensen; Richard B. Emmons

(57) ABSTRACT

The present disclosure provides methods and apparatuses for demodulating discrete-time desired signals in a period-$T_d$ bandpass desired signal in the presence of interference that results from a period-T bandpass interference signal that has been nonlinear distorted. Estimation of the nonlinear-distorted interference and subsequent cancellation from a received signal, that includes the interference and desired signal, produces residual-interference signals. The demodulation of the residual-interference signals uses an equalization technique when $T_d$ is not equal to T. The estimation, cancellation, and demodulation are adapted for changing nonlinear distortion effects.

9 Claims, 8 Drawing Sheets

METHOD AND APPARATUS FOR DEMODULATION OF A DESIRED SIGNAL IN THE PRESENCE OF NONLINEAR-DISTORTED INTERFERENCE

RELATED APPLICATION DATA

This application claims the benefit of U.S. provisional patent application Ser. No. 61/723,570 filed Nov. 7, 2012. The entire contents of the aforementioned patent application is incorporated herein by this reference.

FIELD OF INVENTION

The present invention relates to digital data modulation systems that include nonlinear-distorted interference cancellation and subsequent demodulation of a cancelled signal.

BACKGROUND OF THE INVENTION

It is known to provide cancellation/demodulation systems that include successive interference cancellation (SIC) receivers and satellite systems that employ channel reuse in the satellite downlink. In multiuser applications, for example, a SIC receiver can be used to cancel nonlinear-distorted interference, that is associated with a previously-demodulated stronger user, in order to demodulate the next weaker user.

In a satellite-transponder communication system a local terminal communicates with a remote terminal over a duplex satellite communications link in which a loop-back transponder sends a transmitted signal to both the terminal receivers. The transponder is designated loop-back, or alternatively "bent-pipe", as its operation is limited to bandpass filtering, frequency translation and amplification and does not include demodulation and remodulation. Thus, the downlink to the local terminal contains a relayed-interference signal corresponding to the transmitted signal designated for the remote terminal. Conventionally, to avoid this relayed interference, a satellite communication link can only transmit or receive signals in one direction for a single access use. For example, in a frequency-division multiple access system, a separate bandwidth allocation for the local terminal and a separate bandwidth allocation for a remote terminal would be necessary for communication in both directions. However, the relayed-interference signal at the local transmitter terminal could be generated at the same terminal receiver to cancel this relayed interference. Such cancellation provides reuse of the frequencies in the local terminal bandwidth allocation for return link communication between the remote terminal and the local terminal. However, the power amplifier in the local transmitter is not perfectly linear and may limit the amount of cancellation of the relayed interference and preclude frequency reuse of the downlink channel. The power amplifier can be characterized by a zero-memory nonlinearity. The transmit/receive channel includes linear filtering both before and after the nonlinearity, resulting in a dispersive nonlinear channel. The dispersive nonlinear distortions in such a channel cannot be eliminated by either linear filtering or zero-memory nonlinear compensation at the receiver. Thus, any nonlinear compensation to increase the cancellation level will require techniques that can cope with dispersive nonlinear distortions.

Antenna sizes at the respective terminals, fade margin considerations, and modulation choices affect the level of achievable cancellation in these satellite systems. When the local terminal has a larger diameter antenna, with gain $G_H$, than the remote terminal with an antenna of gain $G_R$, the interference problem will generally be more difficult at the larger antenna terminal. For both signal directions the received bit energy is proportional to the antenna gain product $G_H G_R$ and the transmitted energy per bit. In data transmission with a fixed modulation type the bit error probability is proportional to the received bit energy. Since the antenna gain product is the same in both directions, the transmitted energy per bit can be about the same for the local-to-remote direction as for the remote-to-local direction. However, because the transponder relays the transmitted signal back to the same terminal, the relayed interference signal has received bit energy proportional to the local terminal antenna gain squared. Additionally, although the terminals share the same physical path resulting in the same fade statistics for each direction, differences in the terminal fading compensation systems can result in different power outputs and a more difficult interference problem for the terminal with the higher power. Finally, the data rate and/or the modulation types may be different requiring one of the terminals to transmit more power and thus increasing the interference problem at the associated receiver terminal. These asymmetrical factors in satellite-transponder applications can lead to relayed interference in a frequency-reuse application at the local terminal that is as much as 10 dB stronger than the desired signal from the remote terminal. In satellite systems, bit-error rate performance goals are typically within 0.3 to 0.5 dB of theoretical limits. The cancelled relayed-interference signal is approximately complex Gaussian distributed so that its power adds to the channel noise at the receiver. If 0.4 dB is allocated for performance degradation due to a residual relayed-interference signal alone, the cancellation must push the relayed-interference signal approximately 10 dB below the noise. For the additional 10 dB of interference discussed above relative to the desired remote terminal signal and a signal-to-noise ratio of 7 dB for the desired remote terminal signal, the required cancellation would be equal to 10+10+7=27 dB. Accordingly, compensation of dispersive nonlinear distortions are required if these distortions are greater than this −27 dB threshold.

Existing systems have been developed to provide multiple-access reuse in full-duplex satellite communication systems that operate with a loop-back transponder. These systems use either discrete-time information signals prior to modulation or continuous-time modulation signals prior to the power amplifier to produce a reference signal for purposes of cancellation of the relayed interference at the receiver. U.S. Pat. No. 5,596,439 ('439), describes an open-loop technique consisting of measurement techniques followed by interference reduction based on measured link parameters that are applied to the reference signal. The technique described is for applications where "the relay channel is assumed to be linear" so that the receiver composite signal contains "a copy of said source signal". In nonlinear systems the signal to be cancelled is distorted such that the receiver composite signal does not contain a copy. The estimating means in the '439 patent is realized in Parameter Estimator 28 that measures the linear parameters of delay, frequency, phase, and gain. These parameters do not include nonlinear distortions effects so cancellation levels are limited. Further, errors in open-loop parameter measurement such as Parameter Estimator 28 can significantly degrade subsequent interference reduction relative to a canceller operating in an adaptive closed-loop system.

U.S. Pat. No. 6,859,641 B2 and U.S. Pat. No. 7,228,104 B2 ('641/'104) each describe an adaptive cancellation system that converts a sample of the IF transmitted signal to digital form and converts the IF received signal containing the relayed interference to digital form. Frequency, phase, gain, and delay parameters of the sample of the transmitted signal are adjusted to produce a compensating signal that is added to the digital form received signal to produce a signal of interest. The signal of interest can be converted back to an intermediate frequency for interface with a down-stream demodulator. The 641'/'104 technique does not address distortions due to nonlinearities in the local terminal power amplifier. The reference signal used for cancellation has not passed through the power amplifier nonlinearities and the resulting nonlinear distortions cannot be removed.

In these prior art systems it may be necessary to significantly reduce the power amplifier operating level to insure that the nonlinear distortions are small enough to allow for channel reuse. Such "backoff" of the power amplifier is undesirable because of loss of fade margin.

U.S. Pat. No. 7,522,877 B1 describes an interference-reduction system for the local terminal in the satellite communication configuration described above. The interference-reduction system digitizes and converts to baseband the local terminal IF transmit signal and transfers the bits in the baseband digital signal to a buffer in the local receiver to produce a replica of the local transmitted signal. The replica is then scaled, delayed and distorted to reduce the transponder-relayed local interference signal in a received signal that also contains multiple remote terminal signals. Since the interference reduction is over the local signal bandwidth rather than a single remote terminal signal subband, the effects of nonlinearities in the local transmitter can critically limit interference reduction. Accordingly, the 877 patent describes the generation of AM-Normgain and AM-PM correction arrays that are used for the distortion modification of the local transmitted signal replica.

According to the above described techniques, optimum receiver filtering and subsequent demodulation of the remote-terminal signal is not disclosed and the interference cancellation is over the signal bandwidth of the local terminal signal. The optimum receiver filter for the remote terminal signal is the matched filter $f_d^*(-t)$ corresponding to the remote-terminal transmit filter with impulse response $f_d(t)$. In digital data systems, it is desirable to perform cancellation upon discrete-time signals after optimum receiver filtering and sampling rather than upon the associated continuous-time signal prior to receiver filtering and discrete-time sampling. This follows, first, because the discrete-time signal bandwidth is equal to the digital-modulation signal rate which is smaller than the continuous-time signal bandwidth. In general, interference cancellation levels are greater in a smaller bandwidth. Second, the optimum filtering minimizes the additive channel noise that can degrade cancellation performance.

Distortions produced by a signal that traverses a nonlinear channel are often characterized by a Volterra series expansion. The Volterra series is a generalization of the classical Taylor series. See "Nonlinear System Modeling Based on the Wiener Theory", Proceeding of the IEEE, vol. 69, no. 12, pp. 1557-1573, December 1981. U.S. Pat. No. 3,600,681 describes a nonlinear equalizer based on a Volterra series expansion of nonlinear intersymbol interference (NISI) in a data communication system. In "Adaptive Equalization of Channel Nonlinearities in QAM Data Transmission Systems", D. D. Falconer, Bell System Technical Journal, vol. 57, No. 7, September 1978, [Falconer], the Volterra series for NISI is used in a passband decision feedback equalizer. This equalizer is adapted by adjusting the coefficients of the Volterra series expansion by a gradient algorithm. In Falconer, it was concluded that "the number of nonlinear terms . . . is potentially enormous" and that "the simulation results indicated that inclusion of a large number of nonlinear terms, . . . may be necessary." The complexity of the Volterra series expansion for either voiceband telephone channels or satellite channels with nonlinear power amplifiers has been recognized in "Efficient Equalization of Nonlinear Communication Channels, W. Frank and U. Appel, 1997 IEEE International Conference on Acoustics, Speech, and Signal Processing, vol. III, Apr. 21-24, 1997. [Frank]. In Frank, it is described that a decision feedback equalizer (DFE) uses a nonlinear structure that is a good approximation to the general Volterra filter but with reduced complexity. The nonlinear structure is based on an equivalent lowpass model of a $3^{rd}$ order bandpass nonlinearity. Because this Volterra series approximation provided better improvements at higher signal-to-noise ratio, it is concluded in Frank that the Volterra approximation DFE is better suited to the voiceband telephone channel than radio communications.

Rather than provide compensation for nonlinear distortions at the receiver by using nonlinear equalizers, there are predistortion techniques that can be applied in the transmitter before the nonlinear channel. In "A Data Predistortion Technique with Memory for QAM Radio Systems", IEEE Trans. Communications, Vol. 39, No. 2, February 1991, G. Karam and H. Sari, [Karam], explicit expressions are derived for the $3^{rd}$ and $5^{th}$ order inverse Volterra kernels. Karam also notes that the finite-order inverses grow "very rapidly" with the Volterra order p and the discrete-time signal memory span K. These small order/memory span Volterra inverses are compared in Karam with a lookup memory encoder (referred to as "global compensation" in Karam) that predistorts each possible discrete-time signal data value such that at the discrete-time channel output the center of gravity of the received points is in the correct position in the discrete-time signal constellation. The RAM implementation of the lookup memory encoder requires $K \log_2 M$ address bits where M is the modulation alphabet size. By using a rotation technique based on the center discrete-time signal in the memory span, the number of address bits can be reduced in M-ary QAM by two because of quadrature symmetry. For a given memory span and a practical number of address bits, it is described in Karam that the lookup memory encoder outperforms the Volterra inverse predistortion. However, Karam does not describe a technique for initializing and adapting the lookup memory encoder in the presence of additive noise. Unfortunately, the preamble length for initialization of a predistortion lookup memory encoder can be excessively large. The preamble length is on the order of $AM^{K-1}$ discrete-time signals where A is the averaging time to make the additive noise small compared to an acceptable level of residual distortion. A typical averaging time of 100 discrete-time signals for 8PSK with K=5 would require a preamble of over 400,000 discrete-time signals. This difficulty with initialization and adaptation of distortion compensation systems using lookup table techniques is also noted in "Modeling and Identification of a Nonlinear Power-Amplifier with Memory for Nonlinear Digital Adaptive Pre-Distortion", Proceedings of the SPAWC Workshop, 15-18.6.2003, Rome Italy, by Aschbacher et al, [Aschbacher]. Also recognizing the slow convergence and large number of coefficients in the Volterra series expansion, it is suggested in Aschbacher to identify a nonlinear power amplifier by a simplified Wiener-model consisting of a linear filter followed by a zero-memory nonlinearity. An adaptive Least Means Squares algorithm is used to adapt and track parameters in the linear filter and the zero-memory nonlinearity to minimize the mean square error between the sampled data output of the nonlinear power amplifier and the simplified Wiener-model. This minimization is over the signal bandwidth rather than the smaller discrete-signal bandwidth and the minimization does not include receiver filtering contributions to the nonlinear intersymbol interference. As a result interference cancellation with the Aschbacher identification model would not be as effective as a technique that is receiver based and minimizes a mean square error in the received discrete-time signal values.

Accordingly, there is a need at a receiver terminal in certain digital communication systems for desired-signal demodulation that includes cancellation of nonlinear distorted interference under conditions where an undistorted version of the interference can be produced. Further, it would be desirable to utilize nonlinear techniques that provide faster convergence of the nonlinear series expansion and better performance than prior art systems based on conventional Volterra series expansion techniques. Additionally, it would be desirable that these nonlinear techniques can be initialized and adapted to changing conditions more effectively than prior art lookup memory techniques.

SUMMARY OF THE INVENTION

It is an object of the invention to provide a receiver and method for the demodulation of a bandpass desired signal that is included in a received signal that also includes a bandpass interference signal that has been distorted by a nonlinear channel. The digital modulation includes modulating the digital data to discrete-time signals followed by linear filtering using a waveform filter to produce a continuous-time signal. At a receiver, the continuous-time received signal is linear filtered and time-sampled to produce a sequence of discrete-time receiver signals each of which includes a distorted-interference signal, a desired signal, and a noise signal. In the invention the receiver also has available signal components of the bandpass interference signal that are used to produce a sequence of interference signals that are associated with the distorted-interference signals. Another object of the invention is to provide a technique for estimating the distorted-interference signal using a series expansion of the nonlinearity that functionally depends on a block of the interference signals. This object includes providing improved convergence and performance relative to a conventional Volterra series expansion. Another object of the invention is to provide for efficient initialization and adaptation of the distorted-interference signal estimation. In the invention the distorted-interference signal estimate is used to cancel the associated distorted-interference signal in the receiver signal resulting in a sequence of residual-interference signals. Another object of the invention is to provide an optimum technique for the desired digital-data demodulation of the residual-interference signals.

According to the present invention, in a digital-data communication system, the system including a desired-signal transmitter for modulation of desired digital data into a bandpass desired signal that includes a sequence of discrete-time desired signals that belong to a complex constellation alphabet, and which further includes an interference transmitter for modulation, using a waveform filter and an interference-signal timing clock, of interference digital data into a bandpass interference signal that includes a sequence of discrete-time interference signals that have period T and belong to a complex constellation alphabet and that the bandpass interference signal in the interference signal transmitter traverses a nonlinear channel to produce a bandpass distorted-interference signal, a receiver is provided for demodulation of the desired digital data by processing a received signal, containing the bandpass desired signal and the bandpass distorted-interference signal, where the receiver includes at least: a receiver filter/sampler for filtering the received signal with a matched filter, that has the complex conjugate, time-inverted impulse response of the waveform filter, to produce period-T receiver signals that include distorted-interference signals associated with the bandpass distorted-interference signal; a synchronizer for tracking from the receiver signals a timing phase of the desired signals and adjusting the interference-signal timing clock to produce timing alignment between the desired and the distortion-interference signals; a block generator for producing, for each receiver signal, an associated block of successive interference signals and for identifying within the block a center signal that is sequence-aligned with the associated distorted-interference signal in the received signal; an estimator signal generator for producing estimator signals that include signals that are products of one or more real values of products of interference signals in the block; an estimator weight calculator for producing estimator weights, each associated with a respective estimator signal, that depend on a fixed-length sequence of previous received signals; a dot-product multiplier for multiplication of each of the estimator signals by the associated estimator weight and summation of the products to produce an estimate of the distorted-interference signal; a combiner for summation of the estimate and the associated receiver signal to produce a sequence of residual-interference signals; and a desired-signal demodulator for demodulation of the sequence of residual-interference signals to produce desired-signal estimates and for detection of the estimates to produce decision estimates of the desired digital data.

Also, according to the present invention, in a digital-data communication system, which includes a desired-signal transmitter for modulation of desired digital data into a bandpass desired signal that includes a sequence of desired signals that belong to a complex constellation alphabet, and which further includes an interference-signal transmitter for modulation, using a waveform filter, of interference digital data into a bandpass interference signal that includes a sequence of interference signals that have period T and belong to a complex constellation alphabet and that the bandpass interference signal traverses a nonlinear channel to produce a bandpass distorted-interference signal, a receiver is provided for demodulation of the desired digital data by processing a received signal, containing the bandpass desired signal and the bandpass distorted-interference signal, where the receiver includes at least; a receiver filter/sampler, with a receiver-timing clock, for filtering the received signal with a matched filter, that is the complex conjugate, time-inverted impulse response of the waveform filter, to produce period T/2 discrete-time receiver signals that include distorted-interference signals associated with the bandpass distorted-interference signal; a synchronizer for tracking from the receiver signals a transmission time delay and adjusting the receiver-timing clock such that for each period T, the two received signals include a synchronized-received signal and an antisynchronized-received signal; a block generator for producing, for each synchronized and antisynchronized receiver signal, an associated block of successive interference signals and for identifying within the block a center signal that is sequence-aligned with an associated distorted-interference signal in the receiver signal; an estimator signal generator for producing synchronized and antisynchronized estimator signals that include signals that are products of one or more real values of products of interference signals in the associated block; an estimator weight calculator for producing synchronized and antisynchronized estimator weights, each associated with a respective estimator signal, that depend on previous receiver signals; a synchronized/antisychronized dot-product multiplier for multiplication of each of the synchronized/antisynchronized estimator signals by the associated estimator weight and summation of the products to produce a synchronized/antisynchronized estimate of the associated distorted-interference signal; a combiner for summation of each synchronized/antisynchronized estimate and the associated receiver signal to produce a sequence of residual-interference signals; a desired-signal demodulator for demodulation of the sequence of residual-interference signals to produce desired-signal estimates and for detection of the estimates to produce decision estimates of the desired digital data.

Also, according to the present invention, a method, in a digital-data communication system, which includes transmission of desired digital data that has been modulated into a bandpass desired signal that includes a sequence of desired signals that belong to a complex constellation alphabet, and which further includes transmission of interference digital data that has been modulated, using a waveform filter, into a bandpass interference signal that includes a sequence of interference signals that have period T and belong to a complex constellation alphabet and that the bandpass interference signal traverses a nonlinear channel to produce a distorted-interference signal, at a receiver that processes a received signal, containing the bandpass desired signal and the distorted-interference signal, including the steps of: filtering and sampling the received signal with a matched filter, that is the complex conjugate, time-inverted impulse response of the waveform filter, to produce discrete-time receiver signals that include distorted-interference signals associated with the distorted-interference signal and desired-signals associated with the bandpass desired signal; generating, for each received signal, an associated block of successive interference signals and identifying within the block a center signal that is sequence-aligned with an associated distorted-interference signal in the received signal; producing estimator signals that include signals that are products of one or more real values of products of interference signals in the block; calculating estimator weights, each associated with a respective estimator signal, that depend on previous receiver signals; multiplying an estimator signal by an associated estimator weight and summing products to produce an estimate of the distorted-interference signal; combining the estimate and the associated received signal to produce a residual-interference signal; and demodulating a sequence of the residual-interference signals to produce digital-data estimates of the desired digital data.

Other aspects and embodiments of the invention are discussed below.

BRIEF DESCRIPTION OF THE DRAWINGS

For a fuller understanding of the nature and desired objects of the present invention, reference is made to the following detailed description taken in conjunction with the accompanying drawing figures wherein reference numbers refer to the same, or equivalent, parts of the present invention throughout the various drawings, and wherein.

DEFINITIONS

The instant invention is most clearly understood with reference to the following definitions:

As used in the specification and claims, the singular form "a", "an" and "the" includes plural references unless the context clearly dictates otherwise.

DETAILED DESCRIPTION OF THE INVENTION

Signal Demodulation with Nonlinear-Distorted Interference

Figure 1:
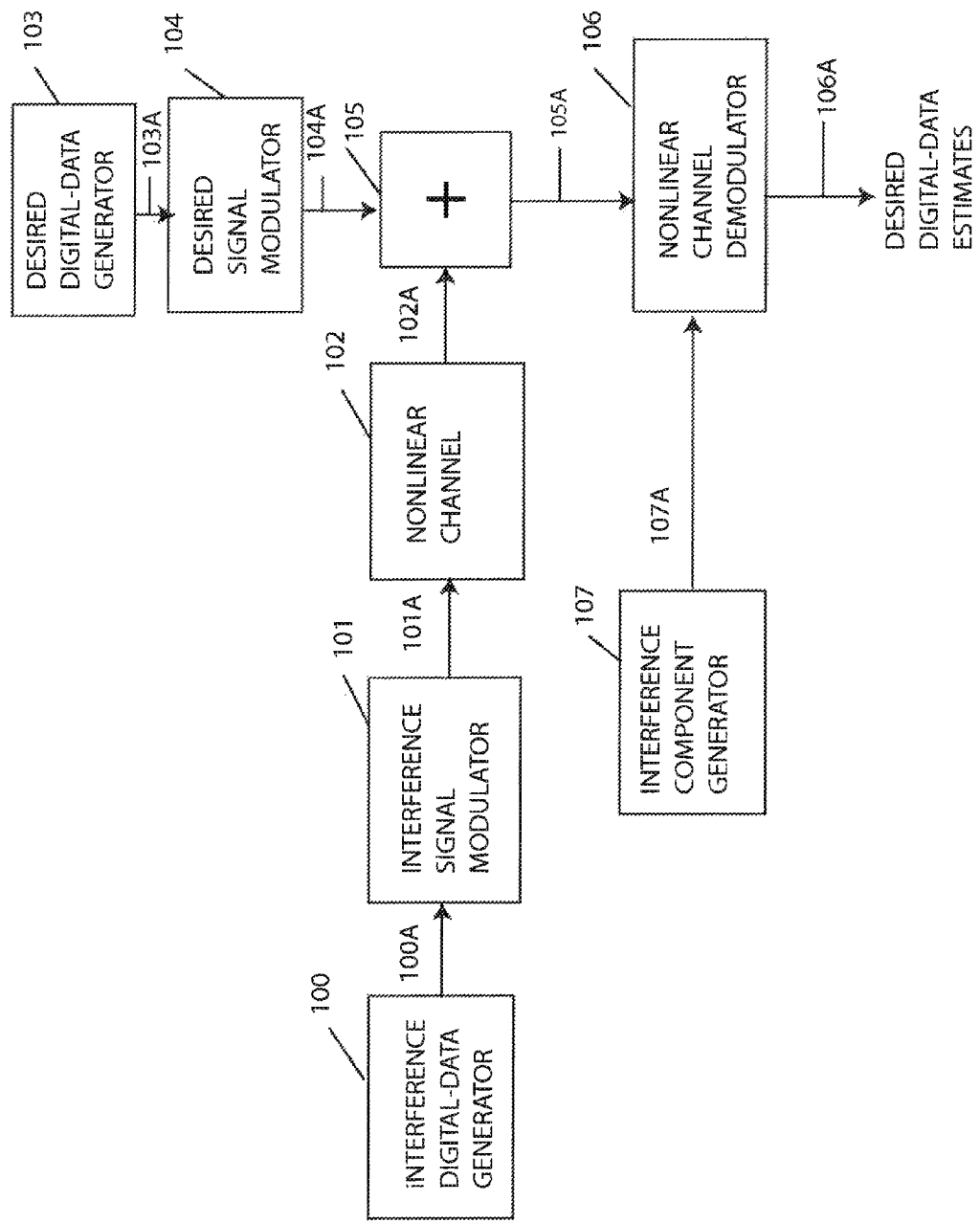
FIG. 1 is a block diagram of a general communication system in which demodulation of a desired signal is accomplished in the presence of a nonlinear-distorted interference signal using a distortion-free version of the interference signal.

The present invention demodulates a bandpass desired signal in the presence of interference that results from a modulation signal that has been nonlinear distorted. The demodulation exploits knowledge of the interference in the modulation signal to estimate a discrete-time nonlinear-distorted interference signal from a received signal that also includes the bandpass desired signal. The interference estimate is used to cancel enough of the distorted interference so that demodulation of the bandpass desired signal can be accomplished. A general application of the invention is shown in FIG. 1. An interference digital data generator 100 produces a series of digital data values that are information values or error-corrected coded values. The interference digital data may also contain synchronizing and framing digits that are required in communication systems. In a transmitter the interference digital data 100A is provided to interference signal modulator 101 for conversion to a bandpass interference signal 101A. In the interference signal modulator 101 the interference digital data 100A is constellation modulated to produce an interference sequence 101B, which includes periodic discrete-time interference signals, that, in turn, is passed through a waveform filter and frequency upconverted to produce the bandpass interference signal 101A. The interference sequence 101B is also provided to interference sequence buffer 107 located in a receiver for purposes of interference cancellation. Returning to the transmitter, the bandpass interference signal 101A is nonlinear distorted in nonlinear channel 102 to produce the bandpass distorted-interference signal 102A. In a similar manner, a desired digital data generator 103 produces desired digital data 103A that is modulated in a desired signal modulator 104 to produce discrete-time desired signals within a desired sequence. The desired sequence passes through a desired-signal waveform filter and the resulting continuous-time signal is frequency upconverted to produce the bandpass desired signal 104A.

In the present invention, the constellation alphabet for the discrete-time interference and desired signals is complex, for example, quadrature modulation techniques such as Quadrature Phase-Shift Keying (QPSK), M-ary PSK, and Quadrature Amplitude Modulation (M-QAM). Some quadrature modulation constellation alphabets, unity-magnitude normalized, are given in Table 1.

TABLE 1

Example Constellation Alphabets

| Modulation | Alphabet |
|---|---|
| QPSK | $(\pm 1 \pm j)/\sqrt{2}$ |
| 8-PSK | $e^{jn\pi/4}$, n = 0, 1, 2, ..., 7 |
| 16-QAM | $(\pm 1 \pm j)/\sqrt{2}$ |
|  | $(\pm 1 \pm j/3)/\sqrt{2}$ |
|  | $(\pm 1/3 \pm j)/\sqrt{2}$ |
|  | $(\pm 1/3 \pm j/3)/\sqrt{2}$ |

In general, the present invention includes any digital-data modulation technique that can be expressed by means of an alphabet with a finite set of complex numbers. Thus, the invention is also applicable to differentially encoded (DE) constellations alphabets such as DEQPSK.

A waveform filter converts discrete-time signals to a continuous-time signal and also provides spectral limitations for subsequent radio transmission after frequency upconversion. A waveform filter is characterized by its filter impulse response. Consecutive discrete-time signals are applied in the form of an impulse train to the waveform filter to produce a series of successive waveforms that forms the continuous-time signal. The constellation period and timing phase of the discrete-time signals in the series are determined by a constellation clock with nominal constellation period T. The discrete-time interference signals signal $i_n$, n integer corresponding to discrete times nT, in interference sequence 101B, are used as described above to produce the bandpass interference signal 101A at the output of the interference signal modulator 101. The bandpass interference signal 101A includes a train of consecutive waveforms that occur at a constellation rate 1/T and overlap each other in time. Each waveform in the train has an associated interference signal $i_n$, n integer, selected from the selected constellation alphabet. Defining the impulse response of the waveform filter in interference signal modulator 101 as f(t), the complex notation representation of the bandpass interference signal 101A is $$i(t) = \Sigma_n^{\infty} = -\infty i_n f(t-nT), \quad (1a)$$

where the constellation timing phase is normalized to zero seconds. The bandpass interference signal 101A at a carrier radian frequency of $\omega_0$ and carrier transmit phase of zero degrees is converted from complex notation as $$i_B(t) = Re\{i(t)e^{j\omega_0 t}\}. \quad (2a)$$

If the waveform impulse response f(t) has a roll-off factor of r, the bandpass (two-sided) bandwidth of the bandpass interference signal is approximately B=(1+r)/T, 0<r<1. Typical values for roll-off factors are 0.25 to 0.6. The bandpass-signal bandwidth B is greater than the discrete-signal bandwidth 1/T. Since depth of interference cancellation increases inversely with bandwidth, one expects, that after traversing a channel and reception at a receiver, discrete-time signal based cancellation, i.e. cancellation of distorted $i_n$ values, will be superior to continuous-time cancellation, i.e. cancellation of a distorted i(t).

In the present invention the bandpass interference signal interferes with the bandpass desired signal that also has the complex-constellation modulation format. The discrete-time desired signals in the desired signal modulator 104 are filtered by a desired-signal waveform filter with impulse response $f_d(t)$ and with a constellation period $T_d$ that may be approximately the same, slightly smaller, or greater than T. In all these cases, it is important that the relative periods remain constant over a time longer than receiver adaptation times. In general, there is also a fixed timing phase offset represented by the time delay $\Delta$ where the magnitude of $\Delta$ is less than or equal to $T_d/2$. The discrete-time desired signal transmitted at the discrete time $nT_d - \Delta$ is defined as $q_n$, n integer, so that after desired-signal waveform filtering the bandpass desired signal q(t), 104A represented in complex notation is $$q(t) = \Sigma_n^{\infty} = -\infty q_n f_d(t-n_d+\Delta). \quad (1b)$$

The bandpass desired signal 104A is at a slightly different carrier radian frequency $\omega_1$ and has an arbitrary carrier phase of $\psi$ degrees:

$$q_B(t) = Re\{q(t)e^{j\omega_1 t+j\psi}\}. \quad (2b)$$

The carrier frequencies $\omega_0$ and $\omega_1$ are sufficiently close such that the bandpass interference and desired signals approximately share the same bandwidth B.

In radio communication and other communication systems, the bandpass interference signal 101A traverses the nonlinear channel 102 that in the present invention results in the bandpass distorted-interference signal 102A. An important example of nonlinear channel 102 is a power amplifier in the transmitter of a radio system. Other examples of the nonlinear channel 102 include a voiceband telephone channel and a magnetic or magnetic-optic recording channel. The telephone channel introduces nonlinear intersymbol interference in a high data rate application. The recording channel produces an overwriting effect introduced by residual magnetism. In a radio system, the bandpass interference signal 101A has been up-converted to a selected radio center frequency for transmission. In general, power amplifiers are linear for smaller input signals but produce amplitude and phase distortions for larger input signals until a saturation level is reached where no further output amplitude increase is possible. This nonlinear effect can be accurately modeled by a zero-memory nonlinear function between the input signal amplitude and the output amplitude and phase. In this amplitude-phase model as described by A. L. Berman and C. H. Mahle, "*Nonlinear phase shift in traveling-wave tubes as applied to multiple access communication satellites*", IEEE Trans. Communications Technology, vol. COM-18, p. 37-48, February 1970, an input bandpass signal corresponding to the interference signal of Eq. (1a) can be written in complex notation as $$i(t) = r(t)e^{j\theta(t)}, \quad (3)$$

where r(t) and $\theta(t)$ are the signal amplitude and phase, respectively. The corresponding complex-notation representation of the bandpass distorted-interference signal for this amplitude-phase model is $$\hat{i}(t) = A[r(t)]e^{j\theta(t)+j\Phi(r(t))}, \quad (4a)$$

where A(r) is a nonlinear function of r, with a leading linear term, representing amplitude distortion and $\Phi(r)$ is a nonlinear function of r, representing phase distortion.

Figure 2:
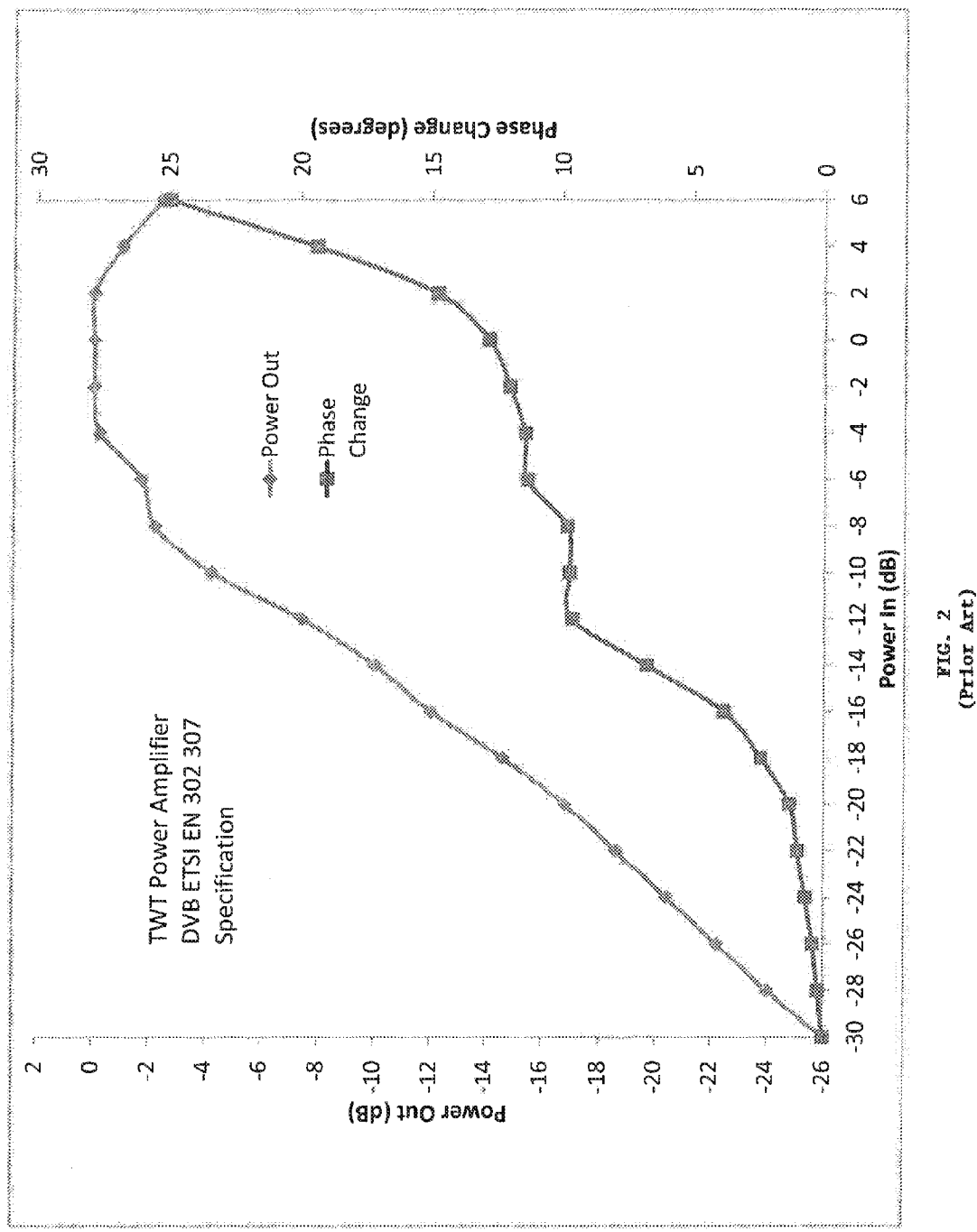
FIG. 2 is a graph of the amplitude and phase outputs as a function of input power for an exemplary power amplifier corresponding to the nonlinear channel of FIG. 1.

An example of this amplitude-phase model is provided in European Standard ETSI EN 302 307 v 1.2.1, (2009-08), Digital Video Broadcasting [DVB], pg 73, as a Tracking Wave Tube (TWT) amplifier model to be used in satellite communication system computer simulations. The Ku-band linearized TWT amplifier amplitude A(r) and phase $\Phi(r)$ functions are reproduced here from DVB, Figure H.11 as FIG. 2.

Although the power amplifier nonlinearity has zero memory, i.e., the amplitude and phase distortion depend only on the amplitude r at any instant of time, linear filtering, prior to the nonlinear channel (amplifier) 102 in the interference signal modulator 101 and linear filtering after the amplifier 102 in the communication medium and a receiver, will result in a dispersive nonlinear characterization that depends on the interference signal sequence in the bandpass interference signal 101A. By determining this characterization as a nonlinear series expansion with respect to the sequence of the interference signals, a basis is obtained for compensation of the nonlinear effects at a subsequent receiver.

Returning to FIG. 1, the bandpass desired signal 104A is combined in a summer 105 with the bandpass distorted-interference signal 102A produced by the nonlinear channel 102. In general in order to accommodate different transmitted data rates, the constellation alphabets and signal periods of the respective interference and desired signals may be different. The bandpass distorted-interference signal 102A precludes successful demodulation of the desired digital-data at a subsequent receiver. Accordingly, the summer 105 produces a received signal 105A that is processed by nonlinear-channel demodulator 106 whose function is to cancel at discrete sampling times, to an acceptable level, discrete-time distorted-interference signals that result from frequency downconverting, filtering, and sampling of the received signal. Subsequent demodulation of a discrete-time desired signal can then be accomplished. This demodulation results in desired digital-data estimates 106A of the desired digital data 103A. The cancellation is made possible by utilizing the interference sequence 101B that produces the bandpass interference signal 101A. The interference sequence 101B in the transmitter is provided to interference sequence buffer 107 where the sequence is stored and delayed before being passed to the nonlinear channel demodulator 106.

Figure 3:
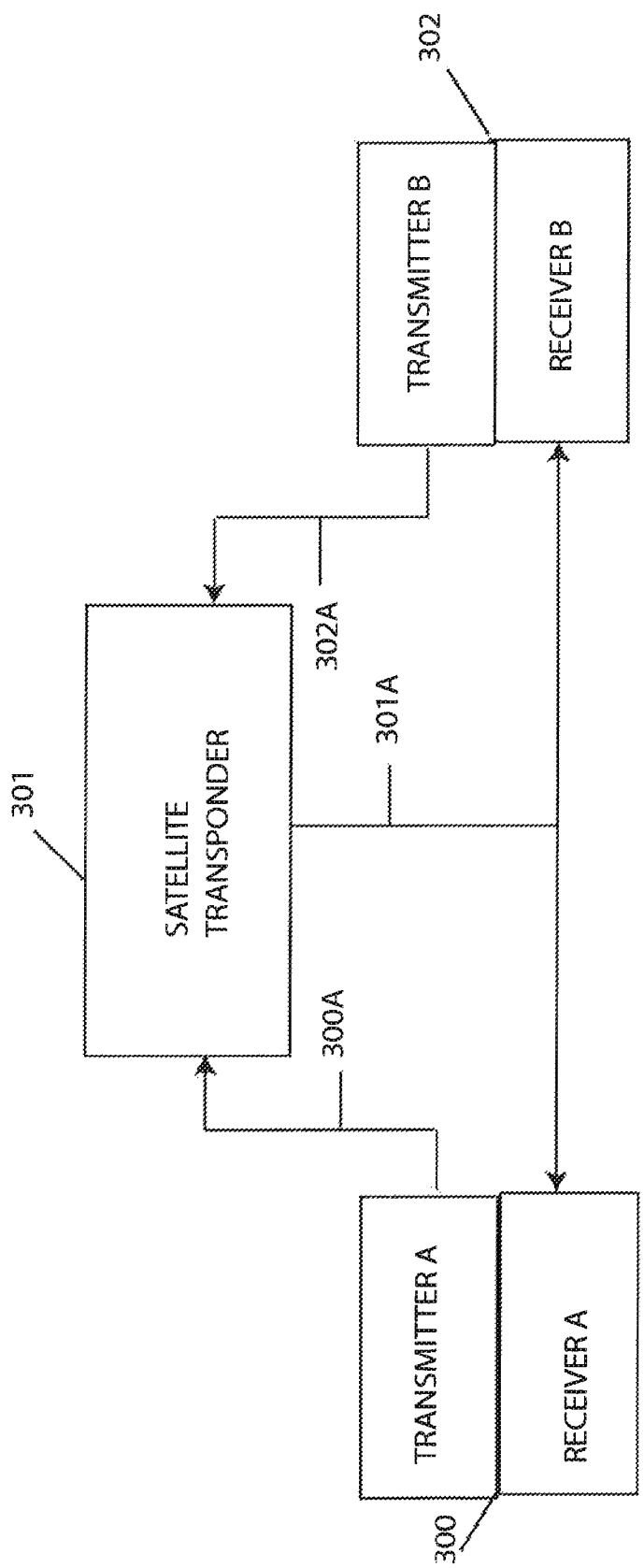
FIG. 3 is a block-diagram of exemplary satellite terminals operating in a loopback transponder configuration, where channel reuse is a specific example of the general communication system of FIG. 1.

An important radio communication example of the general interference system of FIG. 1 is a satellite-transponder communication link with a local terminal 300 transmitting to a satellite transponder 301 and connecting to a remote terminal 302, as shown in FIG. 3. The transmitter/receiver (Transmitter A and Receiver A) at the local terminal 300 and the transmitter/receiver (Transmitter B and Receiver B) at the remote terminal 302 provide full duplex communication through satellite transponder 301. The transponder operation is limited to bandpass filtering, frequency translation, and amplification. In a frequency-division multiple-access application the local transmitter sends a local-terminal signal in frequency band F1 from the local terminal 300 on a link 300A to the satellite transponder 301. The satellite transponder 301 then relays back the filtered and amplified local-terminal signal in frequency band F2 on a downlink 301A to the receiver at the local terminal 300 and also forwards the signal to a receiver at the remote terminal 302. In full duplex operation an uplink 302A is used by the remote terminal 302 to send a transmit signal in frequency band F1. This signal after frequency translation to frequency band F2 will be sent to the receiver at local terminal 300 and will occupy the same frequency band in downlink 301A as the relayed local-terminal signal that is the bandpass distorted-interference signal 102A of FIG. 1. In order to reuse frequency band F2 in this manner with the bandpass desired signal 104A from the remote terminal, it is necessary to cancel the relayed local-terminal signal by exploiting the available signal characteristics at the transmitter in the local terminal 300. In the present invention, the availability of the interference sequence of discrete-time interference signals associated with the local-terminal 300 transmitter A is exploited in the local-terminal 300 receiver A for subsequent interference cancellation and subsequent desired signal demodulation. Many satellite-transponder communication systems have the transmitter and receiver collocated in one physical device facilitating the transfer of the interference sequence. In the present invention satellite-transponder communication systems include point-to-point applications where the respective link terminals transmit to each other within approximately the same bandwidth and certain point-to-multipoint applications.

Figure 4:
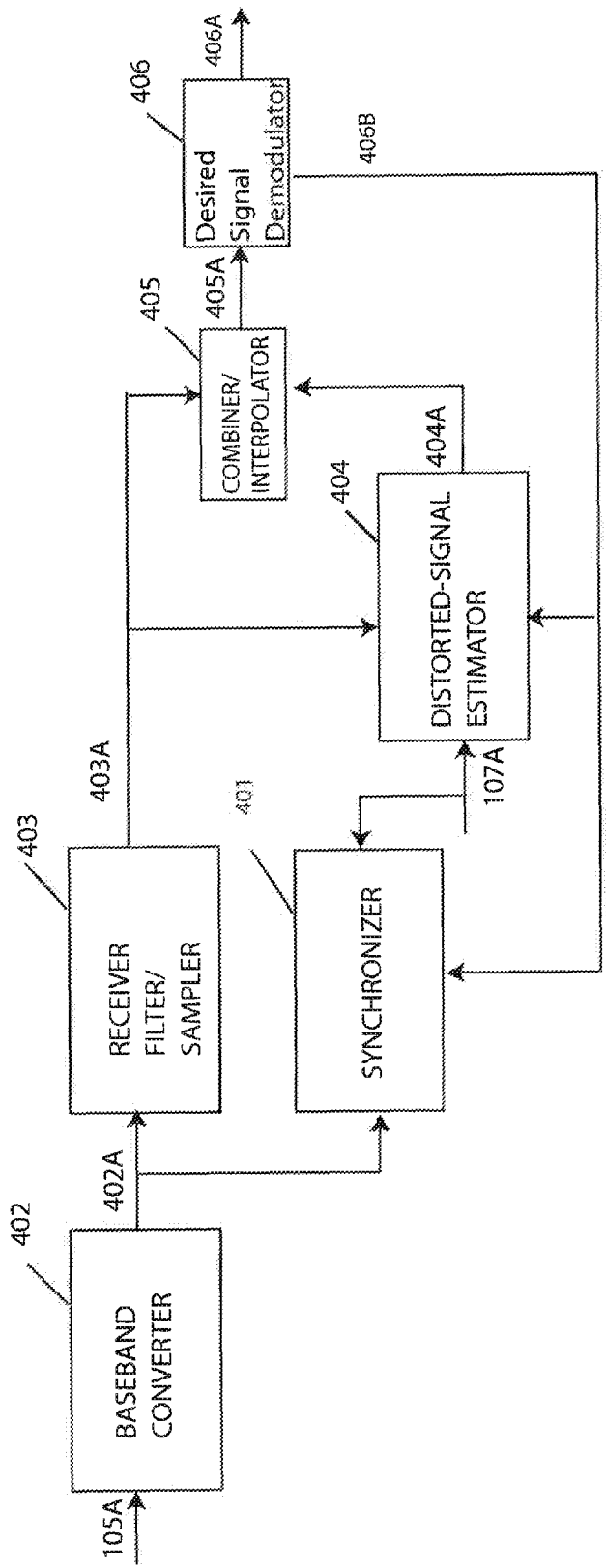
FIG. 4 is a block diagram of the exemplary nonlinear channel demodulator of FIG. 1.

Conversion of Bandpass to Discrete-Time Signals in the Nonlinear-Channel Demodulator FIG. 4 is an example of the nonlinear-channel demodulator 106 in FIG. 1 where the interference sequence buffer 107 provides the delayed interference sequence 107A to the nonlinear-channel demodulator 106. The interference signals are produced at the received-constellation rate $1/T_R$ that is determined by receiver synchronization. A baseband converter 402 converts the received signal 105A to a baseband signal 402A and performs gain adjustment, frequency/phase synchronization, and timing-phase synchronization for the interference signal path. The frequency/phase synchronization estimates and removes the carrier frequency oo and the associated channel phase with respect to the bandpass distorted-interference signal 102A that is a component in the received signal. Timing synchronization aligns and tracks variations between the delayed interference sequence 107A and the received signal component corresponding to the bandpass distorted-interference signal 102A to determine the received-constellation discrete-time signal rate and the timing phase. The gain adjustment, frequency/phase synchronization, and timing synchronization are accomplished in synchronizer 401 by correlation of the delayed interference sequence 107A with the baseband signal 402A and conventional tracking techniques such as gain-control and phase-locked loops. The timing synchronization process results in a received-constellation rate that is nominally the same as the interference constellation rate 1/T. For notational convenience here, it is assumed that $T_R$=T. The delay in interference sequence buffer 107 is adjusted by a time-delay parameter that is also computed in synchronizer 401.

Baseband/digital conversion is achieved by filtering and sampling the baseband signal 402A in receiver filter/sampler 403. In the present invention the waveform filter f(t) in interference signal modulator 101 is used for both interference cancellation and desired signal demodulation. Accordingly, both interference and desired signals in the received signal are filtered with the interference waveform matched filter in the receiver filter sampler 403. The waveform matched filter is the complex conjugate, time-inverted impulse response f*(−t), where f(t)=0, t<0. Because the matched filter is anticausal, a practical implementation requires the introduction of an implementation delay. In the mathematical development to follow it is assumed that the impulse response is time limited to LT seconds, L, integer and L>1. For simplicity of presentation, the implementation delay is taken as zero.

An output 403A of the receiver filter/sampler 403 is a receiver sequence of discrete-time receiver signals, $r_n(\tau)$, n integer, at the constellation rate 1/T. The delay parameter τ represents a sampling time for the receiver sequence. Each receiver signal includes a noise term, a distorted-interference signal $\hat{\imath}_n(\tau)$, and a receiver desired signal. In the gain and timing synchronization described above the received signal $r_n$ is gain-controlled and time aligned with the delayed interference sequence 107A such that the distorted-interference signal $\hat{\imath}_n(\tau)$, for τ=0, and the interference signal $i_n$ have maximum correlation. In the absence of nonlinear distortion, the distorted-interference signal at synchronized sampling time, τ=0, is equal to the delayed interference signal. According to Nyquist theory if the bandwidth B is less than 2/T the interference signal within the received signal is completely defined if there are two receiver sequences with sampling delays τ=0 and τ=τ/2. Within a receiver sequence, the distorted-interference signals are a result of receiver filtering and constellation-rate sampling in receiver filter/sampler 403 of the baseband-converted bandpass distorted-interference signal 102A, that is given in complex notation as $\hat{u}(t)$, Eq. 4a. The distorted-interference signals in the receiver sequence are then given by $$\hat{\iota}_{ri}(\tau) = \int_{nT}^{nT+LT} f^*(t+\tau-nT)\hat{u}(t)dt. \quad (4b)$$

The receiver sequence, at sampling time τ, that contains the distorted-interference signals, Eq. (4b) for discrete-times nT, is provided to distorted-signal estimator 404 that, in turn, produces estimates of the distorted-interference signals. Each estimate is subtracted from the respective receiver signal in combiner 405 to produce a sequence of residual-interference signals 405A. As described below in the two embodiments, these residual-interference signals 405A are further processed in desired-signal demodulator 406 to produce desired-signal estimates 406B that are detected to produce decision estimates 406A of the transmitted desired digital data 103A.

In a preferred embodiment, designated equal-period coordinated transmitters, $T=T_d$, $f(t)=f_d(t)$, and timing synchronization in synchronizer 401 is accomplished between the interference and desired signal terminals by adjusting the interference-signal terminal timing clock such that the timing phase offset Δ in Eq. (1b) is zero, i.e., the discrete-time signals, included in the received signal 105A, are time aligned at the receiver. This time alignment requires the desired-signal estimates 406B derived in desired-signal demodulator 406 to be provided to synchronizer 401. By correlation of the desired-signal estimates and the received signal in synchronizer 401, tracking of the timing phase of the desired signals is accomplished. For this preferred embodiment, time-sampling after the receiver matched filter at τ=0, i.e., synchronized sampling, causes the interference cancellation in combiner 405 to produce the sequence of residual-interference signals 405A and each signal contains a time-aligned estimate that is a gain and frequency/phase version of the desired signal $q_n$. The equal-period coordinated-transmitters embodiment is preferred because only a single estimator of $\hat{\iota}_{ri}(0)$ is required in distorted-signal estimator 404. Implementation of this embodiment generally requires the master/slave timing clock configuration realized in synchronizer 401 with the desired-signal terminal as the master.

Thus, in the preferred embodiment, input digital data to the interference-signal transmitter must be controlled by the transmitter clock. This clock control requirement is not always feasible, or convenient, in practice. Also, the interference and desired signal periods may be significantly different. Accordingly, an alternative embodiment, designated uncoordinated transmitters, is described here for link transmitters with the timing phase offset Δ in Eq. (1b) arbitrary in the interval $-T_d/2 < \Delta \leq T_d/2$ and $T_d$ not necessarily equal to T. In this embodiment there are two receiver sequences provided to distorted-signal estimator 404, a synchronized sequence, $r_n(0)$, n integer, and an antisynchronized sequence, $r_n(\tau/2)$, n integer. Distorted-signal estimator 404 uses two estimators, one for each sequence to produce estimates of the synchronized and antisynchronized distorted-interference signals, $\hat{\iota}_{ri}(0)$ and $$\hat{\iota}_{ri}\left(\frac{T}{2}\right),$$

respectively. After subtraction in combiner 405 from the respective receiver signals, there results two cancellation signals per period-T which together form the T/2 sampled sequence of residual-interference signals 405A subsequent to matched filtering and interference cancellation.

Each residual-interference signal 405A contains a residual interference component and a desired signal component that with respect to the transmitted desired signals has some frequency/phase offset and timing misalignment. The offset and misalignment are corrected in desired-signal modulator using conventional synchronization techniques that are described subsequently. For calculation of a desired signal estimate of a target desired signal, say $q_i$, a cancellation vector of T/2 samples is derived from the residual-interference signal sequence 405A by only selecting samples that have some energy contribution from $q_i$. The cancellation vector corresponding to $q_i$ is denoted as $\underline{c}_i$. This cancellation vector is finite because the combination of desired-signal waveform filter and interference matched filter, i.e. the channel filter, is finite in duration. In general the cancellation vector contains the target desired signal and intersymbol interference (ISI) contributions from adjacent desired signals. After frequency/phase synchronization and timing alignment, the cancellation vector for the zero-index target desired signal can be written as $$\underline{c}_0 = \Sum_{-i1}^{i2} g_i q_i + \underline{u}_0 \quad (5)$$

where each desired signal is multiplied by a coefficient vector and the noise vector includes colored noise due to the receiver matched filter and a residual interference component.

For desired-signal demodulation in the alternate embodiment, it is necessary to consider two possible period relationships. In what is called here the equal-bandwidth relationship, the desired-signal period $T_d$ is nominally equal to the interference-signal period T. For this relationship the residual-interference signals 405A can be used in a sin(πt)/πt (sinc) interpolation to produce any continuous time t for a bandwidth B<=2/T. When the periods are equal and the same Nyquist-type waveform filters are used, after interpolation there is no ISI and coefficient $g_0$ is a scalar.

For what is designated as the unequal bandwidth relationship, there are unequal periods and there exists an optimum detection linear filter with transfer function equal to the ratio of transfer functions of the desired-signal matched filter divided by the interference-signal matched filter. The existence of optimum filter implies that an optimum linear weighting of the cancellation vector by a detection weight vector will provide a nearly optimum estimate of $q_0$. Thus, the unequal-bandwidth condition uses a linear equalizer, viz., $$\hat{q}_0 = w'^* c_0 \quad (6)$$

where the detection weight vector w can be determined with a minimum mean-square error technique. Such a technique computes the detection weight vector such that mean square error between $q_0$ and $\hat{q}_0$ is minimized. This technique can be implemented in real time using the cancellation vectors and previous desired-signal decisions in a Least-Mean Squares (LMS) method. Alternatively the detection weight vector can be precomputed as a function of the known waveform filters. A gradient algorithm is described subsequently to compute this detection weight vector. A general description of linear equalizers and weight calculation techniques including the LMS method are described in "Least Square Estimation with Applications to Digital Signal Processing", A. A. Giordano and F. M. Hsu, John Wiley, New York, N.Y., 1985 [Giordano]. When the desired-signal period is different than the interference period, there are multiple initial symbol phases relative to the T/2 sampling period in the residual-interference signal sequence 405A. For each occurrence of these initial timing phases, it is necessary to calculate and use an optimum detection weight in Eq. (6). Additionally, the optimum detection weight depends on the desired-signal timing phase $\Delta$ in Eq, (1b). Thus, if the detection weight vector is precomputed, the resolution precision and number initial symbol phases will determine the number of sets of detection weights that must be stored.

A gradient algorithm for precomputing the detection weight vector subtracts the negative of an attenuated gradient vector from the present weight vector to produce the next iteration weight vector. For an I coefficient weight vector and a combined desired/interference discrete channel response $\phi_i$, i=1:I, there exists a Toeplitz matrix $\Phi_{i-j}$, that multiplies the weight vector w to produce an equalized T/2-sampled impulse response of length I. A sinc interpolation matrix S further converts this response to the T-sampled equalized response vector:

$$y = S^* \Phi^* w.$$

The gradient algorithm minimizes the vector-norm squared of the error vector equal to w−e, where e is the ideal response with all zeros and a central value equal to unity. The gradient is the vector derivative of this norm with respect to the weight vector. That gradient is equal to $$g = \Phi'^* S'^* (y - e).$$

The nth iteration in the gradient algorithm is $$w(n+1) = w(n) - \alpha^* g(n),$$

where $\alpha$ is an attenuation constant.

The linear equalization, Eq. (6), is accomplished in desired signal demodulator 406 to obtain the sequence of desired signal estimates.

The cancellation level at the output of combiner 405 increases with the number of estimator coefficients. Accordingly, both the equal and unequal bandwidth conditions in the alternative embodiments require two T/2-spaced cancelling operations which will require approximately twice the number of estimator coefficients for the same cancellation level as in the preferred embodiment.

From Eqs. (1a) and (4b), one observes that the distorted-interference signal $\hat{i}_n(\tau)$ has a nonlinear functional relationship with a finite-length block, to be described subsequently, of interference signals that surround the interference signal $i_n$. Within the block of interference signals, the interference signal $i_n$ is approximately centered because of the matched filtering of the baseband-converted bandpass distorted-interference signal. The matched filtering results in both previous and future interference signals contributing to the nonlinear distortion in the distorted-interference signal $\hat{i}_n(\tau)$.

The effects of the nonlinear channel are significant with respect to cancellation of the distorted-interference signal because of its relative size compared to the desired signal. For the demodulation of the desired signal after interference cancellation, the effects of a nonlinear channel in the desired signal path are much less significant and are not considered in this invention.

Estimation of the Distorted-Interference Signals

A Distorted-Signal Estimator (DSE) 404 estimates the distorted-interference signals that result from the interference digital data 102A component of the received signal. The following parameters characterize the distorted-signal estimator 404:

T=constellation period of interference signals;

$\tau$=receiver sequence sampling delay, $\tau$=0 or T/2;

M=number of signal modulation values in the constellation;

L=effective time duration of the waveform filter, f(t);

K=memory span of interference signals;

P=maximum number of interference signals in a nonlinear combination;

W=number of estimator weights; and

N=length of adaptation period.

After gain, frequency/phase, and timing synchronization of the received signal and conversion by the receiver filter/sampler 403 to discrete-time receiver signals as described above, the DSE 404 periodically generates, for each receiver signal and its associated interference signal block, an estimate of the distorted-interference signal $\hat{i}_n(\tau)$.

Figure 5:
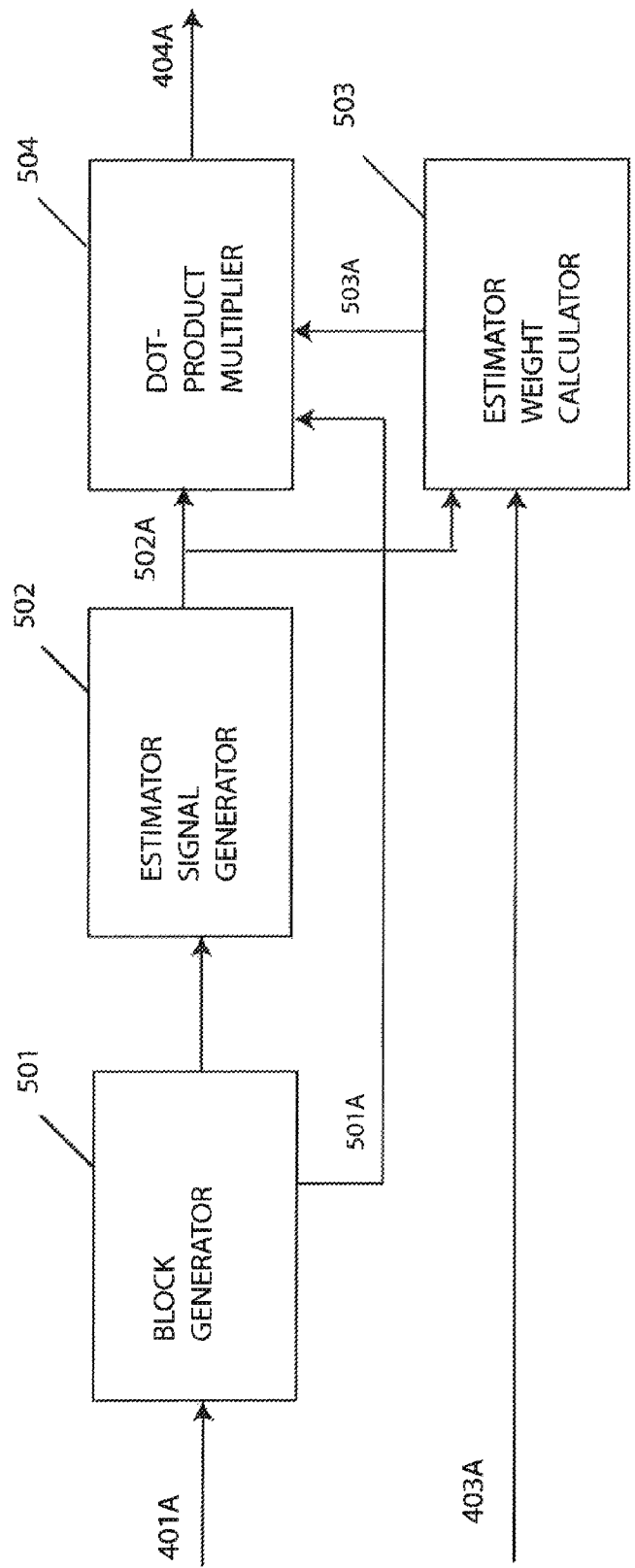
FIG. 5 is a block diagram of the exemplary distorted-signal estimator of FIG. 4.

In FIG. 5, which represents the DSE 404, a block generator 501 receives the delayed-interference sequence and, at index time n, periodically produces an interference-signal block of K interference signals $i_{n+k}$ with k∈K. Within the block for K odd, there are K=2L−1 interference signals $i_{n+k}$ with index times n+k, and K is the set, −L+1≤k≤L−1. Within the block for K even, there are K=2L interference signals $i_{n+k}$ and K is the set, −L+1≤k≤L. The selection L has been determined as the effective length LT of the receiver filter impulse response.

For K odd and $\tau$=0, the interference signal $i_n$ is sequence-aligned with the distorted-interference signal. Within the block, the interference signal $i_n$ is centered within the block and is designated as the center signal. For K even and $\tau$=T/2, the interference signals $i_n$ and $i_{n+1}$ are both center signals in the block because they are the two sequence-aligned signals that are the most significant, and symmetrical, contributors to the distorted-interference signal at $\tau$=T/2. These center designations are used in co-filed U.S. patent application, filed on 30 Jun. 2012, "Method and Apparatus in a Discrete-Time Transmission System for Channel Identification and Estimation of Nonlinear-Distorted Signals" [Estimation], which is incorporated herein by reference, to define sequence symmetry conditions that result in adaptive estimator weights with better cancellation levels. The block generator 501 also exploits a phase-rotation symmetry, described in Estimation, that depends on the fact that the nonlinearity in the continuous-time system depends only on the amplitude of the signal input to the nonlinearity and not its phase. In this phase-rotation symmetry technique, all the interference signals in the block are multiplied by a rotation value that depends on the phase of the center signal. The rotation value has a unit magnitude and a phase such that the multiplication produces phase rotation. This rotation multiplication results in an interference-signal block with rotated-signals $\tilde{i}_{n+k}$, n integer, k∈K that are the components of a K th order rotated-signal vector $\tilde{i}_n$. Within the block the rotated center signal always has phase in the first quadrant of the complex plane, i.e., a phase between zero and 90 degrees. For example, in non-constant modulations such as 16QAM, the rotation value is equal to (1, −j, −1, j) if the center signal is located in respective quadrants (1, 2, 3, 4).

By using an amplitude-based nonlinear expansion, to be described subsequently, of the nonlinear relationship to the block rotated signals, a set of W real estimator signals are derived in an estimator signal generator 502. Each estimator signal contains products of one or more real values of products of the rotated signals in the block. The product combinations of p rotated signals is less than or equal to P, the maximum nonlinear combination in the series expansion. A set of W complex estimator weights are computed, using a Least Means Square (LMS) direct solution to be described subsequently, in an estimator weight calculator 503 that uses as inputs N previous receiver signals $r_k$, k<n, and their associated estimator signals 502A. These estimator weights 503A are provided to a dot-product multiplier 504 where they multiply the associated real estimator signals 502A. For a W-dimensional estimator these estimator weights and estimator signals are represented by W-vectors from which a scalar output can be calculated as the vector dot product. In order to unrotate the effects of the phase rotation of the interference signals, the rotation value is provided on a link 501A to the dot-product multiplier 504 where the complex conjugate of the rotation value multiplies the vector dot product to produce the distorted-interference signal estimate 404A of the distorted-interference signal $\hat{\iota}_n$. In the uncoordinated-transmitter embodiment, there are two receiver sequences 403A, at sampling times $\tau=0$ and $\tau=T/2$. Accordingly, this embodiment requires a distortion-signal estimator as shown in FIG. 5 for each receiver sequence.

Because of the matched filtering with the waveform filter, the rotated signals are a function of the autocorrelation of the waveform filter. This autocorrelation is Hermetian—sequence symmetric that results in sequence symmetry for the K odd and K even examples. This sequence symmetry is exploited in the definition of the estimator signals such as to give the estimator greater flexibility in the estimator weight optimization. For K odd, there is symmetry with respect to an early (relative to the rotated center signal) subblock of rotated source signals and a late (relative to the rotated center signal) subblock of rotated source signals. For K even, there is symmetry with respect to an early (including the lower-indexed center signal) K/2 subblock and a late (including the higher-indexed center signal) K/2 subblock of rotated source signals. The early and late subblocks in the source signal block are assigned respective early and late words equal to a number between 1 and $M^L$ by M-ary conversion of the L signals in each subblock. A sequence symmetry criterion is defined as the lower word weight, i.e., the word number, for the early subblock must be less than or equal to the word weight for the late subblock. In the determination of the rotated source-signal block, the subblocks are complex-conjugate reversed if the sequence symmetry criterion is not satisfied. Simulation tests with and without this sequence symmetry criterion showed significantly superior estimation with sequence symmetry.

Cancellation of the Distorted-Interference Signals

Returning to FIG. 4, the sequence of distorted-interference signal estimates 404A is subtracted in combiner 405 from the receiver-signal sequence 403A to produce the sequence of residual-interference signals 405A. In the coordinated-transmitters embodiment the period-T residual-interference signal sequence 405A contains a time-aligned version of the period-T sequence of desired signals. The time alignment results from the synchronized sampling at $\tau=0$ and the coordinated timing adjustments described previously to the interference-signal timing clock such that the interference/desired timing phase offset $\Delta$ is zero. In the uncoordinated-transmitter embodiment the interpolation or equalization of the residual-interference signals 405A produces a period-$T_d$ sequence of desired signals estimates 406B at the desired-signal synchronization time $nT_d+\Delta$, n integer. Because the distorted-interference and desired signal paths have different gains and carrier frequencies/phases, the residual-interference signals 405A require additional processing in demodulation to obtain estimates of the transmitted desired digital data.

Figure 6:
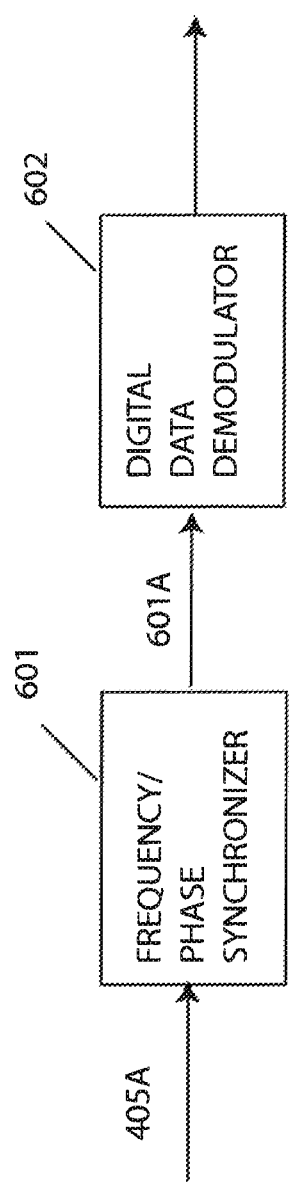
FIG. 6 is a block diagram of the exemplary desired signal demodulator of FIG. 4.

The processing of the residual-interference signals 405A is accomplished in desired-signal demodulator 406. This processing includes (1) desired-signal gain adjustment, (2) removal of a residual frequency error due to the difference in the bandpass-interference signal carrier frequency $\omega_0$ and the bandpass-desired signal carrier frequency $\omega_1$, (3) removal of a residual channel phase error due to the difference in the bandpass-interference signal phase, normalized in Eq. (2a) to zero degrees, and the bandpass-desired signal phase of $\psi$ in Eq. (2b), and (4) demodulation to produce desired-signal estimates and subsequent decision estimates that correspond to the transmitted desired digital data. The desired-signal demodulator 406 is shown in FIG. 6. A frequency/phase synchronizer 601 provides desired signal gain correction and initial acquisition/tracking of the desired signal frequency and channel phase errors. The gain/frequency/phase corrections, in steps (1), (2) and (3) above, are realized by correlating the residual-interference signal sequence 405A with the decision estimates of the desired digital data. Applying these corrections to the residual-interference signals 405A and subsequent interpolation/equalization, described early, produces a sequence 406B of desired-signal estimates. Digital data estimator 603 produces a decision-estimate sequence 406A from sequence 406B that contains either (1) desired digital data decisions by conventional constellation signal to digital data conversion in systems without error correction coding, or (2) soft decisions corresponding to the transmitted desired digital data for use in subsequent error correction decoding. The sequence 406B of decision estimates is provided to distorted-signal estimator 404A in FIG. 4 for use in the computation, to be described subsequently, of the estimator weights.

Mathematical Description of the Distorted-Signal Estimator

An amplitude-based series expansion to describe the linear and nonlinear interference components of the distorted-interference signal is given in Estimation. The DSE uses this series expansion to generate estimator weights that lead to the distorted-interference signal estimate. The adaptation of these W weights using an LMS direct solution with matrix multiplication by a precomputed matrix is described in Estimation. In Estimation, a vector of $N_C$ previous receiver signal values is phase-rotated and premultiplied by a precomputed $W \times N_C$ projection matrix to obtain the calculated weight vector, see Eqs. (26B) and (27). There is a maximum of allowable real signal combinations $N_C$ in Eq. (19) of Estimation. The projection matrix $(HH')^{-1}H$ can be precomputed for the $N_C$ allowable combinations. The matrix H is formed from the allowable estimator-signal column vectors, $\underline{h}_n$=1, 2, . . . N of Eq. (24) in Estimation. The calculation of the weight vector in Eq. (27) then requires an Nc order receiver vector wherein each component is associated with an allowable combination. Some components may not be in a random N-sequence of previous receiver signals and are then assigned a zero value in the $N_C$ order receiver vector. Some components may be repeated in the random N-sequence and these repeat values are averaged and inserted in the $N_C$ order receiver vector. In this manner, a corresponding $N_C$ order receiver vector for the precomputed $W \times N_C$ projection matrix is produced from a random N-sequence of receiver signal values. Precomputation of this projection matrix is possible because it includes all possible estimator signal combinations and does not depend on the receiver-signal vector. Thus adaptation does not require any transmitted preamble or midamble.

The receiver-signal vector contains additive noise which causes a weight misadjustment noise resulting in a larger mean-square error (MSE) than the minimum MSE (MMSE) with optimum weights. The ratio MSE/MMSE is referred to as adaptation misadjustment and is approximately equal to 1+W/N. Also, in this cancellation application, improved tracking results if, in distorted-signal estimator 404, the receiver signals are replaced by error signals that are obtained by subtracting from each receiver signal 403A a bias signal derived from the sequence of associated decision estimates 406B. For the preferred embodiment, the bias signal is the associated decision estimate. For the alternative embodiments, the bias signals for τ=0 and τ=T/2 are derived from a plurality of associated decision estimates so as to represent the continuous-time desired-signal waveform at these sampling times.

Performance of an Example System

In the satellite-transponder system described herein with respect to FIG. 3, frequency reuse and relayed interference cancellation provides the potential for doubling the data rate relative to conventional systems without frequency reuse. Such frequency reuse is only possible if the achievable cancellation of the relayed interference is large enough so that the residual interference after cancellation is small compared to the additive noise. At this level of cancellation the small signal-to-noise ratio degradation associated with doubling the data rate is acceptable. To verify the effectiveness of the frequency reuse system of FIG. 3, a MATLAB simulation was used to provide various orders of cancellation and a bit-error rate evaluation for a Forward-Error-Corrected (FEC) coding of QPSK and 8PSK modulation systems. The MATLAB simulation included a nonlinear power amplifier with the DVB standard nonlinearities shown in FIG. 2. The bit-error-rate tests were for the Average White Gaussian Noise (AWGN) channel as a function of the signal-to-noise ratio defined as the ratio of Energy per information Bit (Eb) to noise spectral density No. Corresponding to the preferred embodiment, the local and remote terminals employed the same waveform filter and the respective timing clocks were synchronized. The waveform filter was a conventional Square-Root-Raised-Cosine filter with a rolloff factor of 0.3. The FEC coding used a convolutional code with code rate ½ and constraint length 7. Tests were run with infinite backoff, i.e., a linear amplifier, to provide a lower bound on performance, and with an output power backoff of 0.1 dB relative to the average transmit power. By choosing a small output power backoff, the results showed a significant increase in measured cancellation levels. In what is judged to be a worst case scenario for a satellite-transponder system the received remote terminal signal is 10 dB weaker than the received distorted-interference signal from the local terminal. These tests are for unknown channels with the periodic use of the LMS direct solution described herein. These adaptive results were within small fractions of a dB relative to simulations under known channel conditions where there is no adaptation noise. The number N of receiver signals in the adaptation interval was selected as 10,000 which provides an adequately small adaptation misadjustment for the selected weight configurations. In the simulation the Distortion Signal Estimator (DSE) was used with an input signal width of K=5 signals and was also configured as a conventional Linear Signal Estimator (LSE). For the DSE the nonlinear signal combinations described herein are used with nonlinear orders of P=2, 3, and 4.

Figure 7:
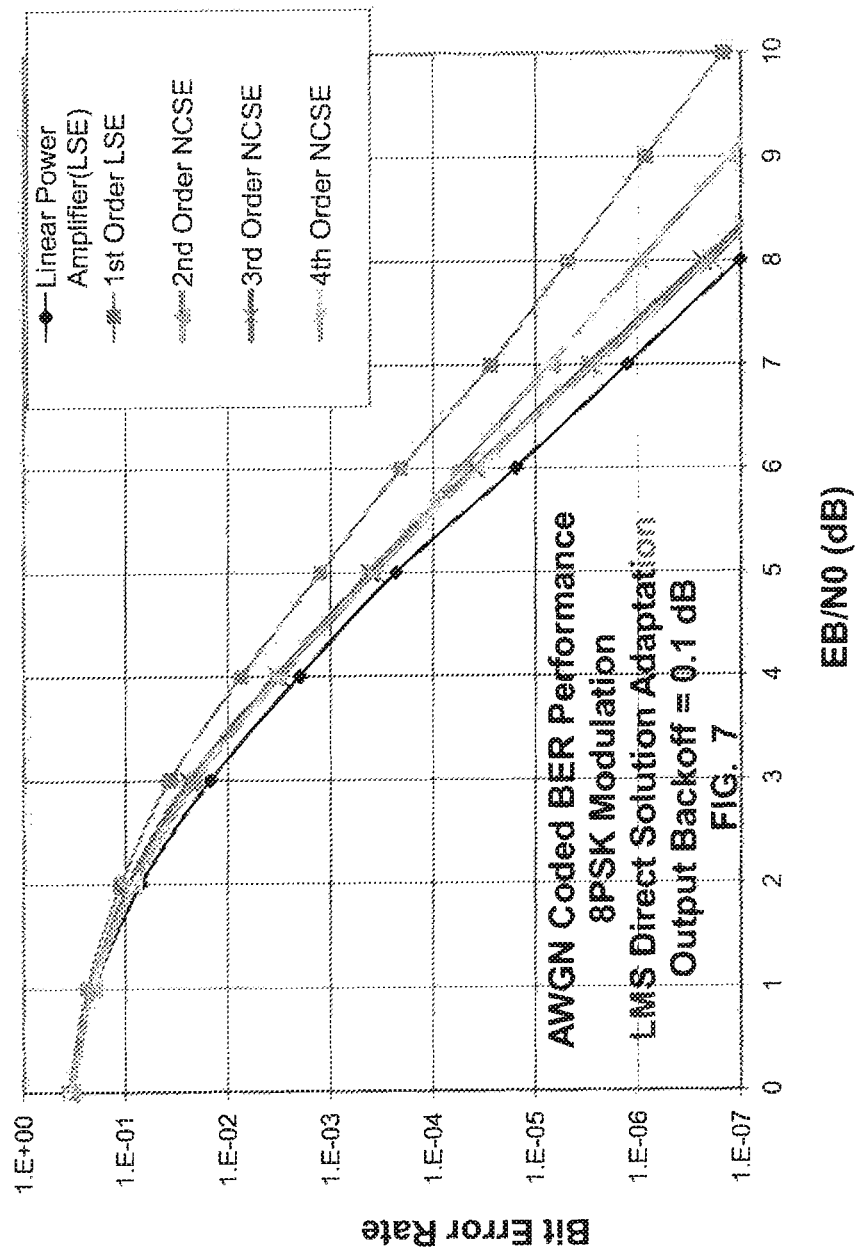
FIG. 7 is an unknown-channel performance graph for channel reuse with coded 8PSK modulation in the satellite system of FIG. 3.

In FIG. 7 the LSE with a linear power amplifier represents a performance lower bound. Significant BER degradation is evident for the LSE operating in the nonlinear channel. At a 1E-7 BER the degradation is slightly larger than 2 dB. Progressively better performance is realized as the nonlinear order of the estimator is increased. At a 1E-8 BER the P=3 and P=4 DSE have about the same performance and an acceptable degradation of about 0.3 dB. The performance is about the same because the additional small cancellation rejection offered by the P=4 canceller is offset by a small increase in weight misadjustment noise due to the larger number of weight coefficients. The 0.3 dB degradation at the coded symbol Es/No of 9.8 dB (8PSK and 8 dB Eb/No with code rate ½) corresponds to a residual interference 11.4 dB below the additive noise or about 9.8+11.4=21.2 dB below Eb. Since the interference is 10 dB larger than the remote signal, the interference cancellation is 31.2 dB. It should be noted that present-day more complex FEC techniques such as Low-Density Parity-Check codes and Turbo-Product Codes will operate in a larger noise environment with the result that the residual interference will be an even smaller fraction of the noise power producing even a smaller degradation. For this example with K=5 and M=8, Table 2 of Estimation shows that the $2^{th}$ order DSE uses 25 estimator weights, the $3^{th}$ order uses 69 weights, and the $4^{th}$ order uses 120 weights.

For comparison of the coordinated (CT) and uncoordinated (UT) transmitter embodiments, the cancellation levels in dB for asymptotically large signal-to-noise ratio were measured under the conditions described above. For the UT embodiment, the symmetrical/antisymmetrical cancellers use respective memory values of 5 and (6,8) for QPSK and (4,8) for 8PSK where the first/second term in the parenthesis is the nonlinear/linear memory expressed as the number of discrete-signal periods. The number of symmetrical and anti-symmetrical weights in the UT embodiment are expressed as first and second terms in parenthesis. Table I gives the cancellation levels for some important examples.

TABLE I

Interference Cancellation Levels

| PSK Order M | Memory K | Weights W | Embodiment CT/UT | Order P | Cancellation dB |
|---|---|---|---|---|---|
| 4 | 5 | 25 | CT | 2 | 32.2 |
| 4 | 5 | 35 | CT | 3 | 33.0 |
| 4 | 5/(6,8) | 35/53 | UT | 3 | 32.8 |
| 8 | 5 | 69 | CT | 3 | 31.2 |
| 8 | 5 | 120 | CT | 4 | 32.0 |
| 8 | 5/(4,8) | 69/57 | UT | 3/4 | 30.3 |

The number of weights for QPSK is less than for 8PSK because the smaller signal set of QPSK requires some terms to be eliminated in the series expansion such that the number of weights is always less than the number of estimator signals. When this requirement is not met, the correlation matrix in the LMS direct solution can be singular. These results do not include weight misadjustment noise because of the infinite Eb/No. Note that the cancellation level for infinite Eb/No for 8PSK, memory 5, order 3, and the CT embodiment is the same as the calculated cancellation level from the BER simulation at 8 dB Eb/No in FIG. 7. This implies that the weight misadjustment noise for this configuration is negligible, i.e. there is no adaptation noise penalty. This result is consistent with BER simulations run with ideal known conditions.

This small or negligible adaptation noise penalty is due to the small value of W/N in the adaptation misadjustment of 1+W/N. For example, the P=3 example in FIG. 7 gives an adaptation misadjustment of 1.0069 or an increase in MSE over MMSE of only 0.03 dB. The prior art has noted the difficulty with initialization and adaptation of distortion compensation systems using lookup-table techniques such as described in Karam. See Background of the Invention above. The lookup table requires storage of E estimator-signal vectors where E is given by Eq. (28) in Estimation. For example, there are E=2304 unique estimator-signal vectors for 8PSK, M=8 and a memory span K=5. The adaptation length for either the adaptive DSE or Karim lookup-table technique needs to be longer than E to insure that all estimator-signal vector combinations are included. However, the Karim lookup table technique has an adaptation misadjustment of approximately 1+E/N. Thus, the adaptation length in these systems must be E/W longer to achieve the same adaptation performance as the adaptive DSE. In this 8PSK, P=3 example, these prior art lookup techniques would require an adaptation length roughly E/W~2304/69 or 33 times longer.

Figure 8:
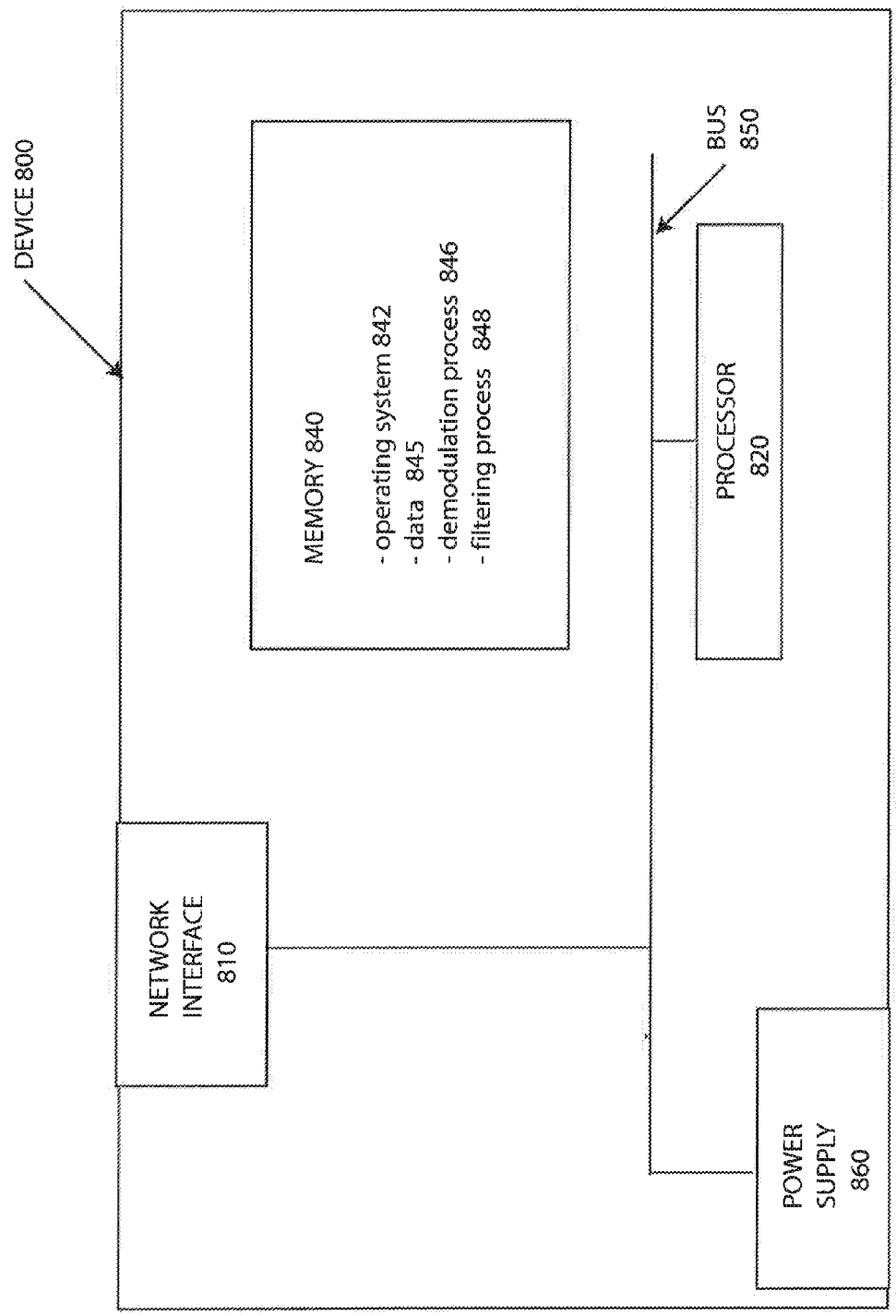
FIG. 8 is a block diagram of an exemplary receiver device.

FIG. 8 is a block diagram of an example device 800 that may be used with one or more embodiments described herein, e.g., as a communication system in which demodulation of a desired signal is accomplished in the presence of a nonlinear-distorted interference signal using a distortion-free version of the interference signal as shown in FIG. 1 above. The device 800 may comprise one or more network interfaces 810 (e.g., wired, wireless, etc.), at least one processor 820, and a memory 840 interconnected by a system bus 850, as well as a power supply 860. The network interface(s) 810 contain the signaling circuitry for communicating data to/from the device 800. The network interfaces may be configured to transmit and/or receive data using a variety of different communication protocols. The memory 840 comprises a plurality of storage locations that are addressable by the processor 820 and the network interfaces 810 for storing software programs and data associated with the embodiments described herein. The processor 820 may comprise hardware elements/logic adapted to execute the software programs and manipulate the data 845. An operating system 842, portions of which are typically resident in memory 840 and executed by the processor, functionally organizes the device by invoking operations in support of software processes and/or services executing on the device. These software processes and/or services may comprise demodulation process 844, filtering process 848, etc., as described above.

It will be apparent to those skilled in the art that other processor and memory types, including various computer-readable media, may be used to store and execute program instructions pertaining to the techniques described herein. Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion.

Although preferred and alternative embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications and other references cited herein are hereby expressly incorporated herein in their entireties by reference.

What is claimed is:

1. A receiver, comprising:
a receiver filter/sampler for filtering, with a matched filter, a received signal containing a bandpass desired signal and a bandpass distorted-interference signal to produce period-T discrete-time receiver signals that include distorted-interference signals associated with the bandpass distorted-interference signal, and desired signals associated with the bandpass desired signal, wherein the matched filter has a complex conjugate, time-inverted impulse response of a waveform filter, wherein T is a positive real number or value;
a synchronizer for tracking from the period-T discrete-time receiver signals a timing phase of the desired signals, and adjusting an interference-signal timing clock to produce a timing alignment between the desired signals and the distortion-interference signals;
a block generator for producing, for each receiver signal, an associated block of successive interference signals that includes a center signal that is sequence-aligned with an associated distorted-interference signal in the receiver signal;
an estimator signal generator for producing estimator signals that include signals that are products of one or more real values of products of interference signals in the block;
an estimator weight calculator for producing estimator weights, each associated with a respective estimator signal, and that depend on previous receiver signals;
a dot-product multiplier for multiplication of each of the estimator signals by the associated estimator weight and summation of the products to produce an estimate of the associated distorted-interference signal;
a combiner for summation of the estimate and the associated receiver signal to produce a sequence of residual-interference signals; and
a desired-signal demodulator for demodulation of the sequence of residual-interference signals to produce desired-signal estimates and for detection of said estimates to produce decision estimates of the desired digital-data;
wherein the receiver is in a digital-data communication system including the receiver, a desired-signal transmitter, and an interference-signal transmitter,
the desired-signal transmitter for modulation of desired digital-data into the bandpass desired signal including a sequence of desired signals that belongs to a complex constellation alphabet, and
the interference-signal transmitter for modulation, using the waveform filter and the interference-signal timing clock, of interference digital-data into a bandpass interference signal that includes a sequence of interference signals that have period T and belong to a complex constellation alphabet, and that the bandpass interference signal traverses a nonlinear channel to produce the bandpass distorted-interference signal.

2. The receiver of claim 1, wherein the estimator weight calculator periodically calculates the estimator weights by a Least-Mean-Squares direct solution that uses a sequence of error signals derived from subtracting from a previous receiver signal an associated decision estimate.

3. A receiver, comprising:
a receiver filter/sampler with a receiver-timing clock for filtering, with a matched filter, a received signal containing a bandpass desired signal and a bandpass distorted-interference signal to produce period-T/2 discrete-time receiver signals that include distorted-interference signals associated with the bandpass distorted-interference signal, wherein the matched filter has a complex conjugate, time-inverted impulse response of a waveform filter, wherein T is a positive real number or value;
a synchronizer for tracking from the period-T/2 discrete-time receiver signals a transmission time delay, and adjusting a receiver-timing clock such that for each period T, the two receiver signals include a synchronized-receiver signal and an antisynchronized-receiver signal;

a block generator for producing, for each synchronized and antisynchronized receiver signal, an associated block of successive interference signals that includes within the block a center signal that is sequence-aligned with an associated distorted-interference signal in the receiver signal;

an estimator signal generator for producing synchronized and antisynchronized estimator signals that include signals that are products of one or more real values of products of interference signals in the associated block;

an estimator weight calculator for producing synchronized and antisynchronized estimator weights, each associated with a respective estimator signal, and that depend on previous receiver signals;

a synchronized/antisychronized dot-product multiplier for multiplication of each of the synchronized/antisynchronized estimator signals by the associated estimator weight and summation of the products to produce a synchronized/antisynchronized estimate of the associated distorted-interference signal;

a combiner for summation of each synchronized/antisynchronized estimate and the associated receiver signal to produce a sequence of residual-interference signals;

a desired-signal demodulator for demodulation of the sequence of residual-interference signals to produce desired-signal estimates and for detection of said estimates to produce decision estimates of the desired digital-data;

wherein the receiver is in a digital-data communication system including the receiver, a desired-signal transmitter, and an interference-signal transmitter, the desired-signal transmitter for modulation of desired digtal-data into the bandpass desired signal including a sequence of desired signals that belongs to a complex constellation alphabet, and the interference-signal transmitter for modulation, using the waveform filter, of interference digital-data into a bandpass interference signal that includes a sequence of interference signals that have period T and belong to a complex constellation alphabet, and that the bandpass interference signal traverses a nonlinear channel to produce the bandpass distorted-interference signal.

4. The receiver of claim 3, wherein the desired signals have a period nominally equal to T and the desired-signal demodulator includes an interpolator for producing the desired-signal estimates by interpolation of the residual-interference signals.

5. The receiver of claim 3, wherein the desired signals have a period of greater than or less than T and the desired-signal demodulator includes an equalizer for producing the desired-signal estimates.

6. The receiver of claim 3, wherein the estimator weight calculator periodically calculates the estimator weights by a Least-Mean-Squares direct solution that uses a sequence of error signals derived from subtracting from a previous receiver signal a bias signal that is derived from a plurality of associated decision estimates.

7. A method, comprising:
receiving, at a receiver in a digital-data communication system, a received signal containing a bandpass desired signal and a bandpass distorted-interference signal;

filtering and sampling, with a matched filter, the received signal to produce discrete-time receiver signals that include distorted-interference signals associated with the distorted-interference signal, and desired-signals associated with the bandpass desired signal, wherein the matched filter has a complex conjugate, time-inverted impulse response of a waveform filter;

generating, for each receiver signal, an associated block of successive interference signals, one of which is a center signal that is sequence-aligned with an associated distorted-interference signal in the receiver signal;

producing estimator signals that include signals that are products of one or more real values of products of interference signals in the block;

calculating estimator weights, each associated with a respective estimator signal, and that depend on previous receiver signals;

multiplying an estimator signal by an associated estimator weight and summing products to produce an estimate of the distorted-interference signal;

combining the estimate and the associated receiver signal to produce a residual-interference signal; and demodulating a sequence of the residual-interference signals to produce digital-data estimates of the desired digital-data, wherein the digital-data communication system includes transmission of desired digital-data that has been modulated into a bandpass desired signal that includes a sequence of desired signals that belongs to a complex constellation alphabet, and which further includes transmission of interference digital-data that has been modulated, using the waveform filter, into a bandpass interference signal that includes a sequence of interference signals that have period T and belong to a complex constellation alphabet, and that the bandpass interference signal traverses a nonlinear channel to produce the bandpass distorted-interference signal, wherein T is a positive real number or value.

8. The method of claim 7, wherein the desired signals have a period nominally equal to T and the combining step further includes interpolating the residual-interference signals to produce residual-interference signals that are time-aligned with the desired signals in the received signal.

9. The method of claim 7, wherein the desired signals have a period of greater than or less than T and the demodulating step includes equalization of the residual-interference signals.

* * * * *